(12) United States Patent
Lee et al.

(10) Patent No.: US 11,550,504 B2
(45) Date of Patent: Jan. 10, 2023

(54) SYSTEM INCLUDING AN APPLICATION PROCESSOR AND A DATA STORAGE DEVICE PROVIDING DATA

(71) Applicants: SK hynix Inc., Gyeonggi-do (KR); Sogang University Research and Business Development Foundation, Seoul (KR)

(72) Inventors: Changgyu Lee, Seoul (KR); Youngjae Kim, Seoul (KR); Donggyu Park, Gyeonggi-do (KR); Mingyo Jung, Seoul (KR); Sungyong Park, Seoul (KR); Jung Ki Noh, Gyeonggi-do (KR); Woo Suk Chung, Gyeonggi-do (KR); Kyoung Park, Gyeonggi-do (KR)

(73) Assignees: SK hynix Inc., Gyeonggi-do (KR); Sogang University Research and Business Development Foundation, Seoul (KR)

( * ) Notice: Subject to any disclaimer, the term of this patent is extended or adjusted under 35 U.S.C. 154(b) by 123 days.

(21) Appl. No.: 16/994,265

(22) Filed: Aug. 14, 2020

(65) Prior Publication Data
US 2021/0223991 A1 Jul. 22, 2021

(30) Foreign Application Priority Data
Jan. 20, 2020 (KR) .......................... 10-2020-0007202

(51) Int. Cl.
*G06F 3/06* (2006.01)
(52) U.S. Cl.
CPC .......... *G06F 3/0659* (2013.01); *G06F 3/0611* (2013.01); *G06F 3/0673* (2013.01);
(Continued)

(58) Field of Classification Search
CPC ... G05B 2219/21097; G06F 2213/2802; G06F 3/0659; G06F 3/0611; G06F 3/0673; G01R 31/31725
See application file for complete search history.

(56) References Cited

U.S. PATENT DOCUMENTS

| 10,216,419 B2 | 2/2019 | De |
| 2002/0091844 A1* | 7/2002 | Craft ..................... H04L 69/162 |
| | | 719/321 |

(Continued)

FOREIGN PATENT DOCUMENTS

KR 10-2000721 7/2019

OTHER PUBLICATIONS

SCSI CRM (SCSI Commands Reference Manual, 100293068, Rev. J Oct. 2016) (Year: 2016).*

(Continued)

*Primary Examiner* — Tim T Vo
*Assistant Examiner* — Janice M. Girouard
(74) *Attorney, Agent, or Firm* — IP & T Group LLP (57) ABSTRACT

A system includes an application processor configured to generate a read request and including a data memory; a host processor configured to generate a read command corresponding to the read request; and a data storage device including a data storage memory, wherein the data storage device transmits read data output from the data storage device according to the read command to the data memory of the application processor without passing the host processor.

14 Claims, 7 Drawing Sheets

(52) U.S. Cl.
    CPC .............. *G05B 2219/21097* (2013.01); *G06F 2213/2802* (2013.01)

(56) References Cited

U.S. PATENT DOCUMENTS

| | | | | |
|---|---|---|---|---|
| 2010/0017496 | A1* | 1/2010 | Kimmel | G06F 12/0868 709/215 |
| 2015/0347349 | A1* | 12/2015 | Raindel | G06F 13/28 710/308 |
| 2018/0063555 | A1* | 3/2018 | Raduchel | G06F 9/452 |
| 2019/0244140 | A1* | 8/2019 | Lee | G06F 3/0659 |
| 2021/0117333 | A1* | 4/2021 | Qureshi | G06F 3/0679 |

OTHER PUBLICATIONS

An article titled Data Transfer Matters for GPU Computing by Yusuke Fujii, Takuya Azumi, el al, and presented at the 2013 International Conference on Parallel and Distributed Systems, available online at https://ieeexplore.ieee.org/document/6808184 and attached dot this office action. (Year: 2013).*

Luebke et al., GPGPU: general-purpose computation on graphics hardware, Proceedings of the 2006 ACM/IEEE conference on Supercomputing ACM, 2006.

Jiang et al., Scaling up MapReduce-based big data processing on multi-GPU systems, Cluster Computing 18.1 (2015), pp. 369-383.

Singh et al., A survey on platforms for big data analytics, Journal of big data 2 Article No. 8, Oct. 2014, pp. 1-20.

Markthub et al, DRAGON: breaking GPU memory capacity limits with direct NVM access., Proceedings of the International Conference for High Performance Computing, Networking, Storage, and Analysis. IEEE Press, 2018.

Escriva et al., HyperDex: A distributed, searchable key-value store, Proceedings of the ACM SIGCOMM 2012 conference on Applications, technologies, architectures, and protocols for computer communication. ACM, 2012.

Decandia et al., Dynamo: amazon's highly available key-value store., ACM SIGOPS operating systems review. vol. 41 No 6. ACM, 2007.

LevelDB, https://github.com/google/leveldb.

LMDB, http://www.lmdb.tech/doc/.

RocksDB, http://rocksdb.org.

Jin et al., KAML: A flexible, high-performance key-value SSD, 2017 IEEE International Symposium on High Performance Computer Architecture (HPCA). IEEE, 2017. pp 373-384.

Wu et al., KVSSD: Close integration of LSM trees and flash translation layer for write-efficient KV store, 2018 Design, Automation & Test in Europe Conference & Exhibition (Date). IEEE, 2018, pp. 563-568.

Chung et al., LightStore: Software-defined Network-attached Key-value Drives, Proceedings of the Twenty-Fourth International Conference on Architectural Support for Programming Languages and Operating Systems. ACM, 2019, pp. 939-953.

Huynh et al., Scalable framework for mapping streaming applications onto multi-GPU systems, ACM Sigplan Notices. vol. 47. No. 8. ACM, 2012, pp. 1-10.

Sabne et al., Scaling large-data computations on multi-GPU accelerators, Proceedings of the 27th international ACM conference on International conference on supercomputing. ACM, 2013, pp. 443-454.

Gelado et al., An asymmetric distributed shared memory model for heterogeneous parallel systems., ACM SIGARCH Computer Architecture News. vol. 38. No 1. ACM, 2010, pp. 347-358.

Silberstein et al., GPUfs: integrating a file system with GPUs, ACM SIGPLAN Notices. vol. 48. No. 4. ACM, 2013, pp. 485-497.

Silberstein et al., GPUnet: Networking abstractions for GPU programs, ACM Transactions on Computer Systems (TOCS), vol. 34, No. 3, Article 9, Sep. 2016, pp. 1-31.

Gu, Boncheol, et al. "Biscuit: A framework for near-data processing of big data workloads." ACM SIGARCH Computer Architecture News vol. 44 No. 3. IEEE Press, 2016, pp. 153-165.

Koo et al., Summarizer: trading communication with computing near storage, Proceedings of the 50th Annual IEEE/ACM International Symposium on Microarchitecture. ACM, 2017, pp. 219-231.

NVM Express, https://nvmexpress.org/.

GPUDirect RDMA, https://docs.nvidia.com/cuda/gpudirect-rdma/.

AMD's DirectGMA, https://gpuopen.com/compute-product/direct-gma/.

Zhang et al., Nvmmu: A non-volatile memory management unit for heterogeneous gpu-ssd architectures, 2015 International Conference on Parallel Architecture and Compilation (PACT). IEEE, 2015, pp. 13-24.

Bergman et al., SPIN: Seamless operating system integration of peer-to-peer DMA between SSDs and GPUs, ACM Transactions on Computer Systems (TOCS), vol. 36, No. 2, Article 5, Apr. 2019, pp. 1-26.

Liu et al., Hippogriff: Efficiently moving data in heterogeneous computing systems, 2016 IEEE 34th International Conference on Computer Design (ICCD). IEEE, 2016, pp. 376-379.

Shihab et al., GPUdrive: Reconsidering storage accesses for gpu acceleration, Workshop on Architectures and Systems for Big Data. 2014, pp. 1-6.

Vesely et al., Generic system calls for GPUs, ACM/IEEE 45th Annual International Symposium on Computer Architecture, IEEE, 2018, pp. 843-856.

Stuart et al., GPU-to-CPU callbacks, European Conference on Parallel Processing. Springer, Berlin, Heidelberg, 2010, pp. 365-372.

Wu et al., Data mining with big data, IEEE transactions on knowledge and data engineering 26.1 (2013), pp. 97-107.

O'Neil et al., The log-structured merge-tree (LSM-tree), Acta Informatica 33.4 (1996), pp. 351-385.

* cited by examiner

SYSTEM INCLUDING AN APPLICATION PROCESSOR AND A DATA STORAGE DEVICE PROVIDING DATA

CROSS-REFERENCE TO RELATED APPLICATIONS

The present application claims priority under 35 U.S.C. § 119(a) to Korean Patent Application No. 10-2020-0007202, filed on Jan. 20, 2020, which is incorporated herein by reference in its entirety.

BACKGROUND

1. Technical Field

Embodiments generally relate to a system including a data storage device transmitting data directly to an application processor without passing a host processor.

2. Related Art

In a conventional system that processes large amounts of data such as machine learning and big data using an application processor such as a graphics processing unit (GPU), the GPU may perform an operation of reading data or writing data in a data storage device such as a solid state drive (SSD).

In this case, the GPU must use a host processor such as a central processing unit (CPU) to read and write data between the data storage device.

Conventionally, for an operation in which a GPU reads data from an SSD, an operation of requesting data from the GPU to the CPU, an operation of requesting data from the CPU to the SSD and receiving requested data, and an operation of transferring the requested data from the CPU to the GPU are sequentially performed.

Also, it may be necessary to temporarily copy data to a main memory device during a data transfer process, which also takes time.

For this reason, there is a problem that performance is deteriorated due to a very long waiting time at the GPU, and such a problem becomes severe when the data usage is high.

In addition, system resources may be excessively consumed for data duplication in a data storage device, a CPU, a main memory, a GPU, etc.

SUMMARY

In accordance with the present teachings, a system may include an application processor configured to generate a read request and including a data memory; a host processor configured to generate a read command corresponding to the read request; and a data storage device including a data storage memory, wherein the data storage device transmits read data output from the data storage device according to the read command to the data memory of the application processor without passing the host processor.

BRIEF DESCRIPTION OF THE DRAWINGS

The accompanying figures, wherein like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

Figure 1:
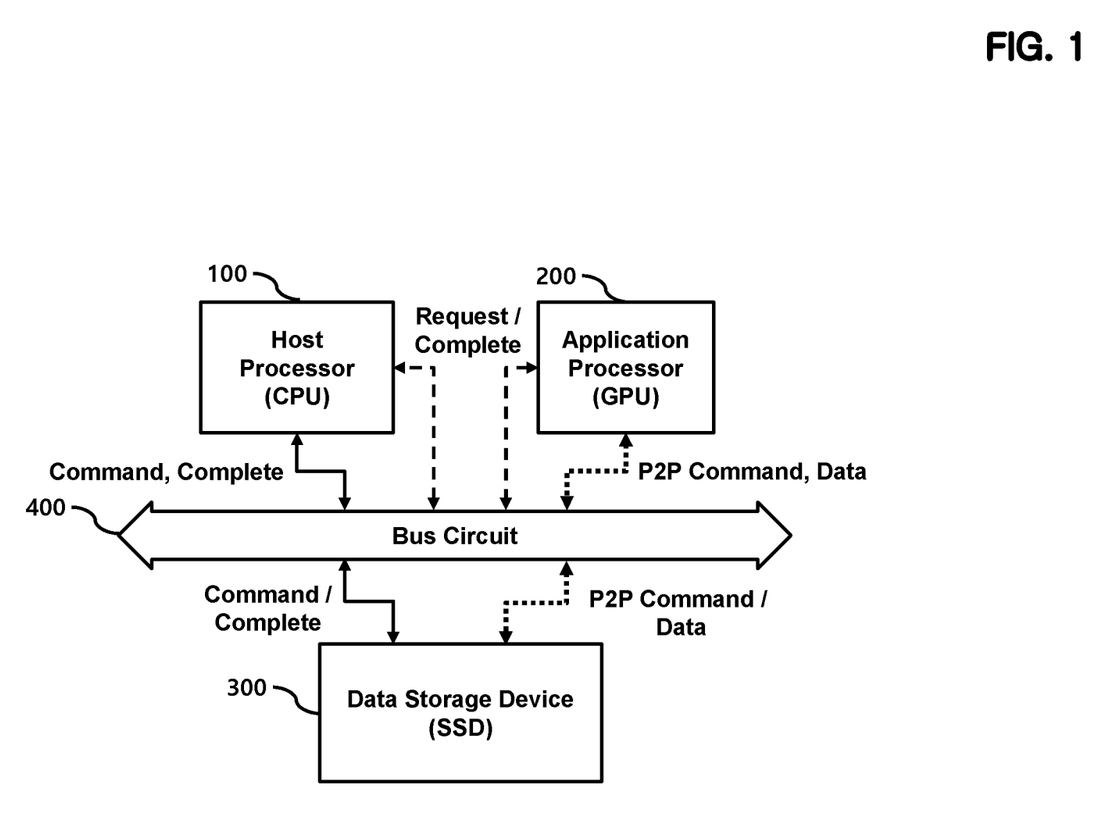
FIG. 1 shows a block diagram of a system according to an embodiment of the present disclosure.

FIG. 1 shows a block diagram of a system according to an embodiment of the present disclosure.

The system according to an embodiment of the present disclosure includes a host processor 100, an application processor 200, a data storage device 300, and a bus circuit 400.

In this embodiment, the host processor 100 is, for example, a central processing unit (CPU), and the application processor 200 is, for example, a graphics processing unit (GPU).

The application processor 200 may provide a data read/write request to the host processor 100 through the bus circuit 400 and receive information on completion of processing of the read/write request.

In this embodiment, the bus circuit 400 may conform to an interface standard such as the PCIe standard.

The host processor 100 provides data read/write requests to the data storage device 300 through the bus circuit 400.

In the present embodiment, the data storage device 300 is, for example, a Solid-State Drive (SSD).

The data storage device 300 may be, for example, a block-based device that reads or writes data corresponding to a logical address, or a key-value (KV) based device that reads or writes a value corresponding to a key. But the data storage device 300 is not limited to a specific type of device.

In a KV based device, a value may be referred to as value data or data.

In the case of a block-based device, a request or a command may have a format for reading data corresponding to a logical address or writing data corresponding to a logical address.

In the case of a KV based device, a request or a command may have a format for reading a value corresponding to a key or writing a value corresponding to a key.

The format of a request and a command for a block-based or a KV-based device can be variously designed by a person skilled in the art with reference to a conventional technique.

In this embodiment, the data storage device 300 and the application processor 200 can directly exchange data in a P2P manner.

That is, in this embodiment, data corresponding to an address or data corresponding to a key may be exchanged between the data storage device 300 and the application processor 200 without passing the host processor 100. At this time, data may be exchanged via the bus circuit 400.

P2P instructions required for data exchange may also be exchanged between the data storage device 300 and the application processor 200.

The data storage device 300 may provide the host processor 100 via the bus circuit 400 that processing of the read or write command has been completed.

In the embodiment in FIG. 1, the host processor 100, the application processor 200, and the data storage device 300 exchange requests, commands, data, etc. via the bus circuit 400.

However, the present invention is not necessarily limited to these examples.

In another embodiment, the host processor 100, the application processor 200, and the data storage device 300 may exchange requests, commands, and data without going through the bus circuit 400.

Figure 2:
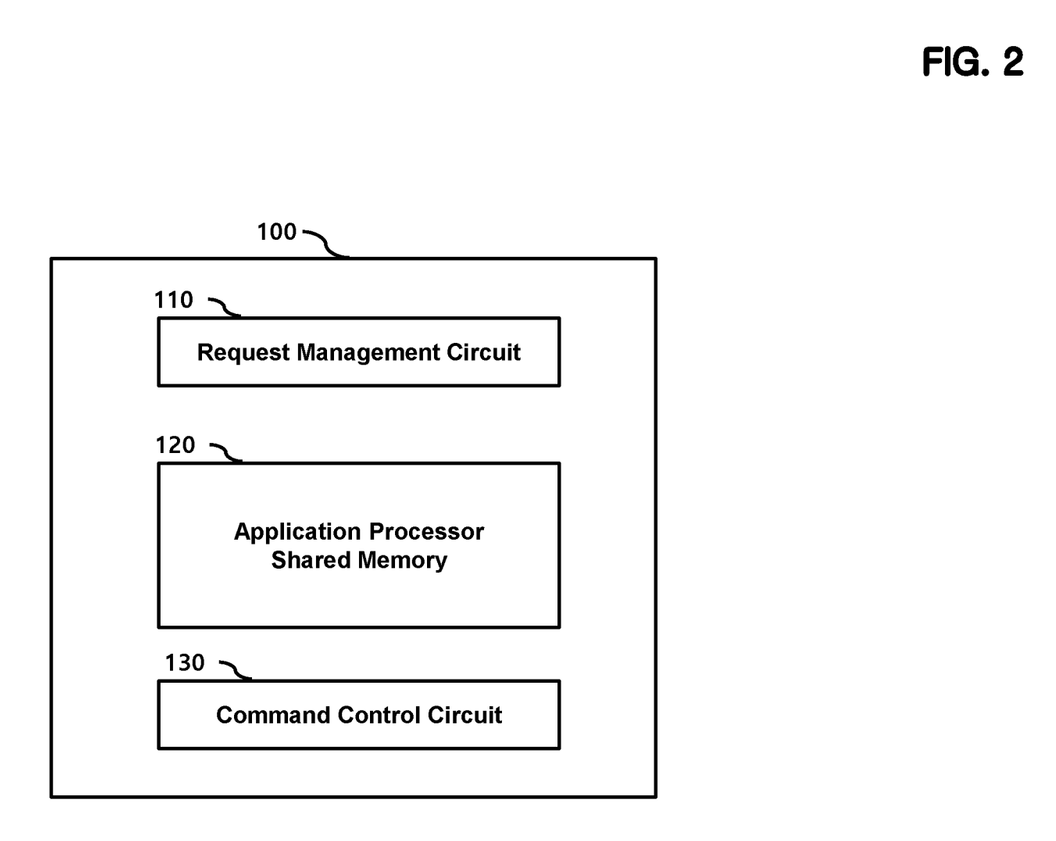
FIG. 2 shows a block diagram of a host processor according to an embodiment of the present disclosure.

FIG. 2 is a block diagram illustrating a host processor 100 according to an embodiment of the present disclosure.

The host processor 100 includes a request management circuit 110, an application processor shared memory 120, and a command control circuit 130.

The request management circuit 110 monitors the application processor shared memory 120 in a manner such as polling, and controls the command control circuit 130 to process the read/write request provided from the application processor 200.

The application processor shared memory 120 is a storage space that can be accessed by the application processor 200 during read or write operations.

The application processor 200 may write a read/write request to the application processor shared memory 120 via the bus circuit 400.

The application processor 200 may generate a read/write request in units of threads, warps, or thread blocks, for example.

A request may include information such as type of request, identification information indicating a subject (thread, warp, or thread block) that provided the request, information about an address or key to perform the request, and length of data.

In this embodiment, the application processor 200 additionally provides an offset to the host processor 100 along with a request for P2P data exchange.

In the case of a read request, the offset information indicates an offset of an address to be stored in the application processor 200 when the data read from the data storage device 300 is provided to the application processor 200. An offset may be referred to as offset information.

In the case of a write request, the offset information indicates an offset of an address of data to be stored in the application processor 200 when data stored in the application processor 200 is provided to the data storage device 300.

The use of the offset information will be described in detail below.

The command control circuit 130 generates a read/write command for controlling the data storage device 300 in response to a read/write request.

The command control circuit 130 provides read/write commands to the data storage device 300 via the bus circuit 400.

The data storage device 300 performs a read/write operation according to a read/write command.

Data corresponding to a read/write operation may be exchanged in a P2P manner between the data storage device 300 and the application processor 200 as described above.

When a read/write operation is completed, the data storage device 300 provides a complete signal indicating that processing of a command has been completed to the host processor 100 via the bus circuit 400.

The request management circuit 110 of the host processor 100 receives the complete signal and records a flag corresponding to the complete signal in the application processor shared memory 120.

The application processor 200 may also monitor the application processor shared memory 120 by polling, and detect whether processing of the request is completed.

The application processor 200 may perform a subsequent operation such as a computation operation using processing result of the request.

Figure 3:
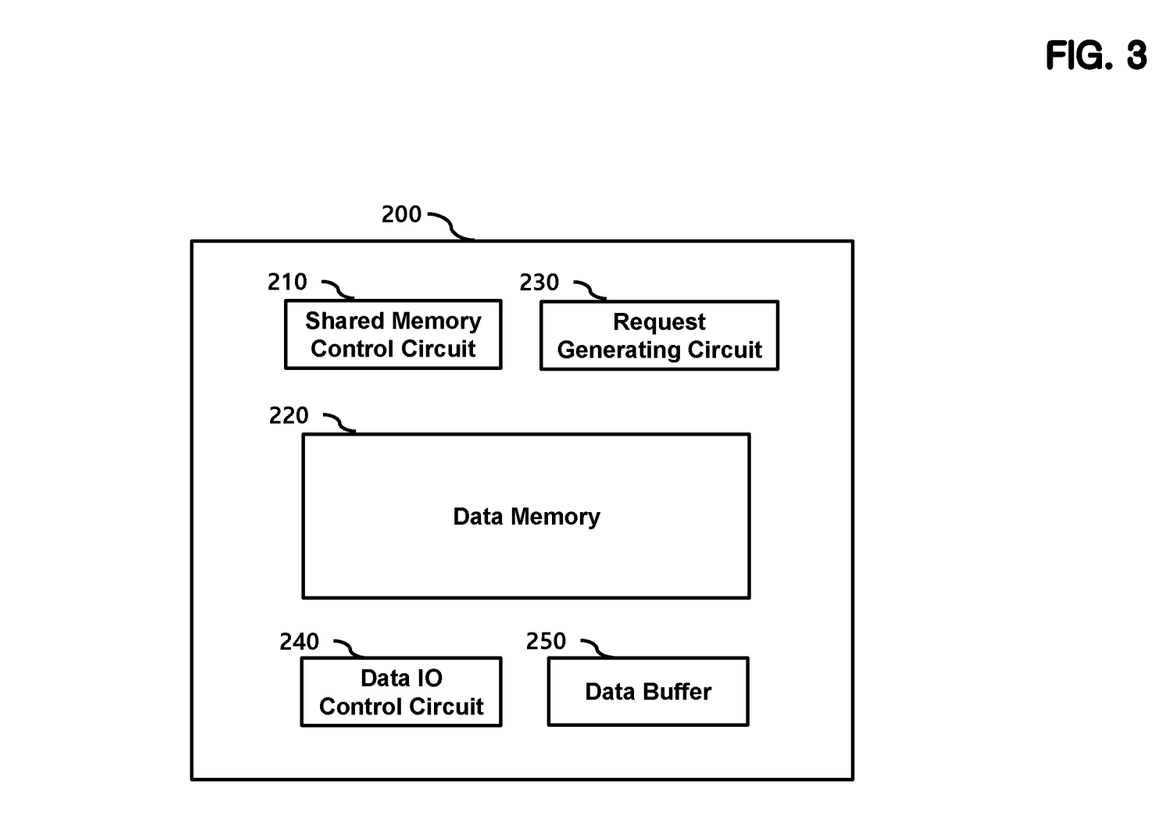
FIG. 3 shows a block diagram of an application processor according to an embodiment of the present disclosure.

FIG. 3 is a block diagram illustrating an application processor 200 according to an embodiment of the present disclosure.

The application processor 200 includes a shared memory control circuit 210, a data memory 220, a request generating circuit 230, and a data input/output (IO) control circuit 240.

First, the request generating circuit 230 generates a read/write request to be provided to the host processor 100, where a request may have units such as threads, warps, and thread blocks in the case of the GPU.

The shared memory control circuit 210 records a read/write request in the application processor shared memory 120 or checks the processing result of a read/write request in the application processor shared memory 120.

The shared memory control circuit 210 may use polling or other technique to check processing result of a read/write request.

The data memory 220 is a space for receiving and storing read-requested data from the data storage device 300 in a P2P manner or for storing write-requested data in a P2P manner before transmitting the data to the data storage device 300.

An address in which data is stored in the data memory 220 may be identified through an offset.

As described above, the shared memory control circuit 210 transmits the offset information to the host processor 100 together with a read/write request.

To perform data exchange in a P2P manner, a certain area of the data memory 220 may be shared with the data storage device 300.

This will be described in detail below.

The data IO control circuit 240 controls an operation of exchanging data in a P2P manner between the data memory 220 and the data storage device 300.

P2P data exchange can be implemented using techniques such as Direct Memory Access (DMA), therefore detailed description thereof is not repeated.

The application processor 200 may further include a data buffer 250.

The data buffer 250 may temporarily store write-requested data before transmitting it to the data storage device 300 or temporarily receive read-requested data from the data storage device 300.

Hereinafter, the data IO control circuit 240 included in the application processor 200 may be referred to as a first data IO control circuit 240 and the data buffer 250 may be referred to as a first data buffer 250.

Figure 4:
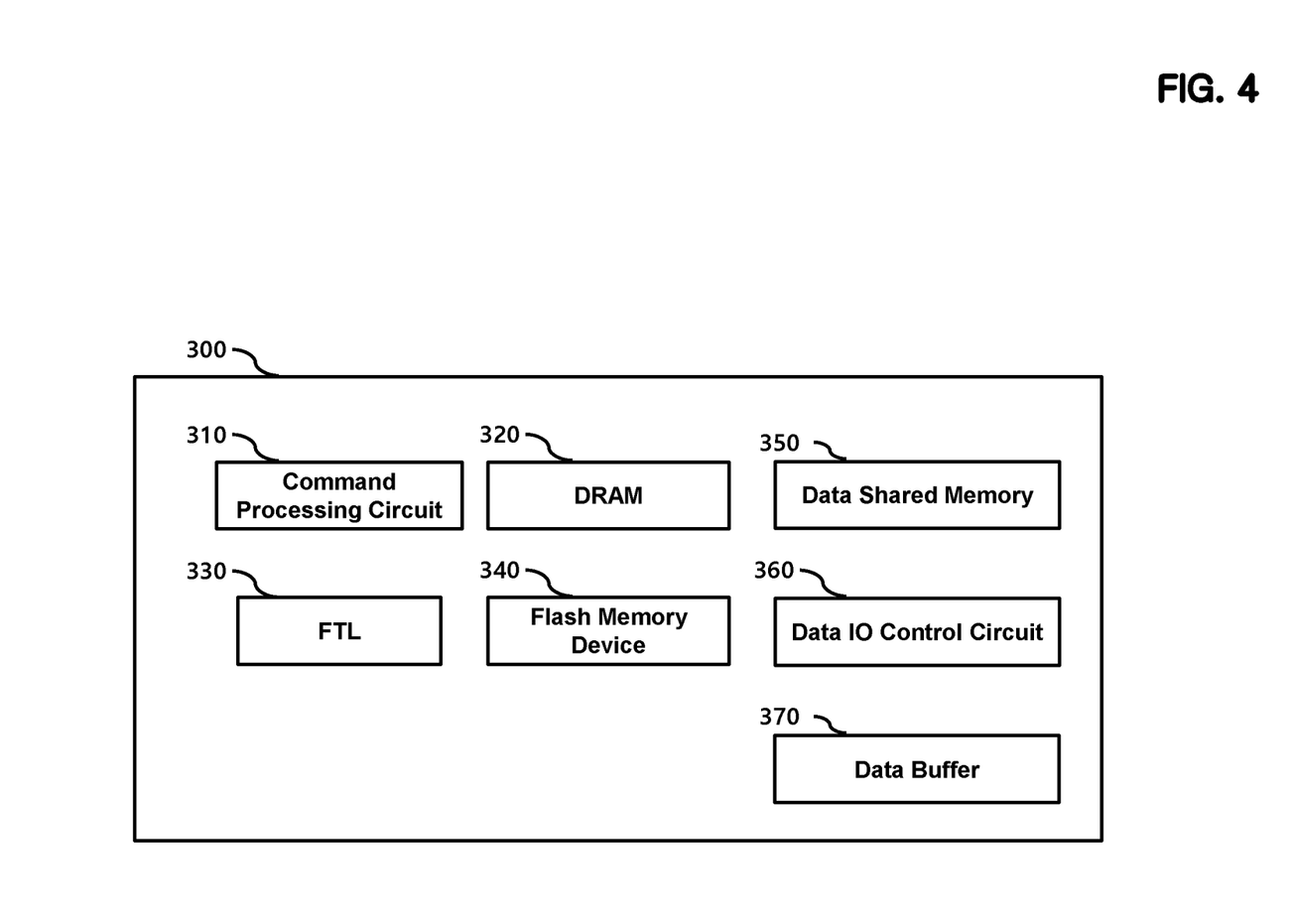
FIG. 4 shows a block diagram of a data storage device according to an embodiment of the present disclosure.

FIG. 4 is a block diagram illustrating a data storage device 300 according to an embodiment of the present disclosure.

The data storage device 300 according to an embodiment of the present disclosure includes a command processing circuit 310, a DRAM 320, a flash translation layer (FTL) 330, a flash memory device 340, a data shared memory 350, and a data IO control circuit 360 and a data buffer 370.

In this embodiment, the data storage device 300 is basically assumed to be an SSD including a flash memory device 340, but the invention is not necessarily limited to such an embodiment.

Hereinafter, the flash memory device 340 may be referred to as a data storage memory 340.

The command processing circuit 310 controls an operation of reading or writing data using commands provided from the host processor 100.

In the case of a block-based device, the command processing circuit 310 controls an operation of reading and writing data corresponding to a logical address.

In the case of a KV based device, the command processing circuit 310 may manage a data structure for managing key information and address information in which a value corresponding to a key is stored.

Through this, when a key is input, an address of a value corresponding to a key can be identified, and a KV based operation is processed by storing a value in the address.

The detailed configuration the command processing circuit 310 for a block-based device or a KV based device is not a subject of the invention and the command processing circuit 310 is not necessarily limited to a specific configuration.

A command provided from the host processor 100 further includes offset information required for P2P data exchange.

The command processing circuit 310 controls an operation of reading and writing data to and from a physical address of the flash memory device 340 using the FTL 330 according to a read/write command.

The DRAM 320 stores a mapping table that manages a relationship between logical and physical addresses.

The FTL 330 is an element that controls operations such as address mapping and garbage collection. Since the configuration and operation are well known, detailed descriptions thereof are not repeated.

The data shared memory 350 stores data to be shared with the application processor 200.

Figure 5:
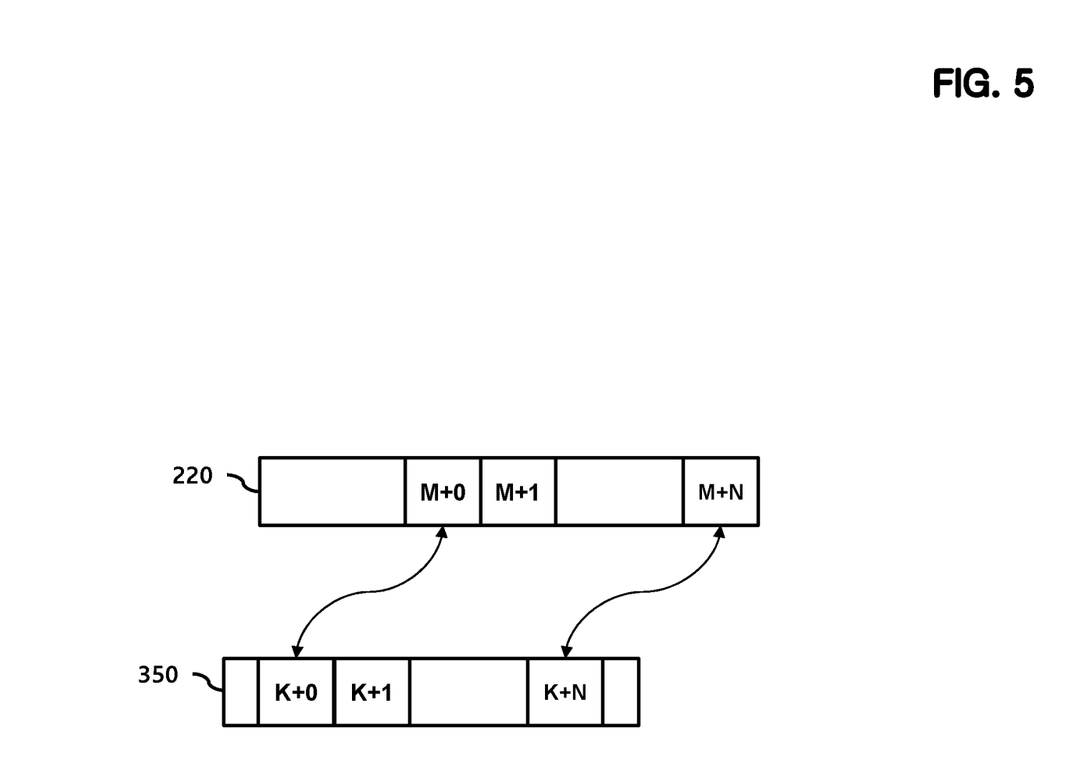
FIG. 5 illustrates a relationship between a data shared memory and a data memory according to an embodiment of the present disclosure.

The data shared memory 350 and the data memory 220 of the application processor 200 may have a relationship as disclosed in FIG. 5.

FIG. 5 illustrates a relationship between the data shared memory 350 and the data memory 220 included in the application processor 200.

The space between the address M+0 and the address M+N of the data memory 220 is shared with the space between the address K+0 to K+N of the data shared memory 350 and is used to perform data exchange in a P2P manner (M and K are integers greater than or equal to 0, and N is a natural number).

0 to N represent offsets. For example, when an offset is 0, address M of the data memory 220 stores the same data as address K of the data shared memory 350 during P2P data exchange.

In the case of a read operation, data is moved from the data shared memory 350 to the data memory 220. In the case of a write operation, data is moved from the data memory 220 to the data shared memory 350.

Returning to FIG. 4, the data IO control circuit 360 controls the operation of exchanging data directly with the application processor 200 in a P2P manner.

The data buffer 370 may temporarily store data to be transmitted to the application processor 200 by a read request or temporarily store data transmitted from the application processor 200 by a write request.

The data IO control circuit 360 included in the data storage device 300 may be referred to as a second data IO control circuit 360 and the data buffer 370 may be referred to as a second data IO buffer 370.

A read operation in the data storage device 300 is completed by transmitting data from the data shared memory 350 to the application processor 200.

A write operation in the data storage device 300 may be completed after writing data stored in the data shared memory 350 to the flash memory device 340.

When a read/write operation is completed, the command processing circuit 310 notifies the host processor 100 that processing of a command is completed.

In response to this, the command control circuit 130 of the host processor 100 records completion of the processing of the corresponding request in the application processor shared memory 120.

The shared memory control circuit 210 of the application processor 200 monitors the application processor shared memory 120 to confirm the completion of the request.

The request generating circuit 230 of the application processor 200 may perform a subsequent operation or generate a new request using the processing result.

Figure 6:
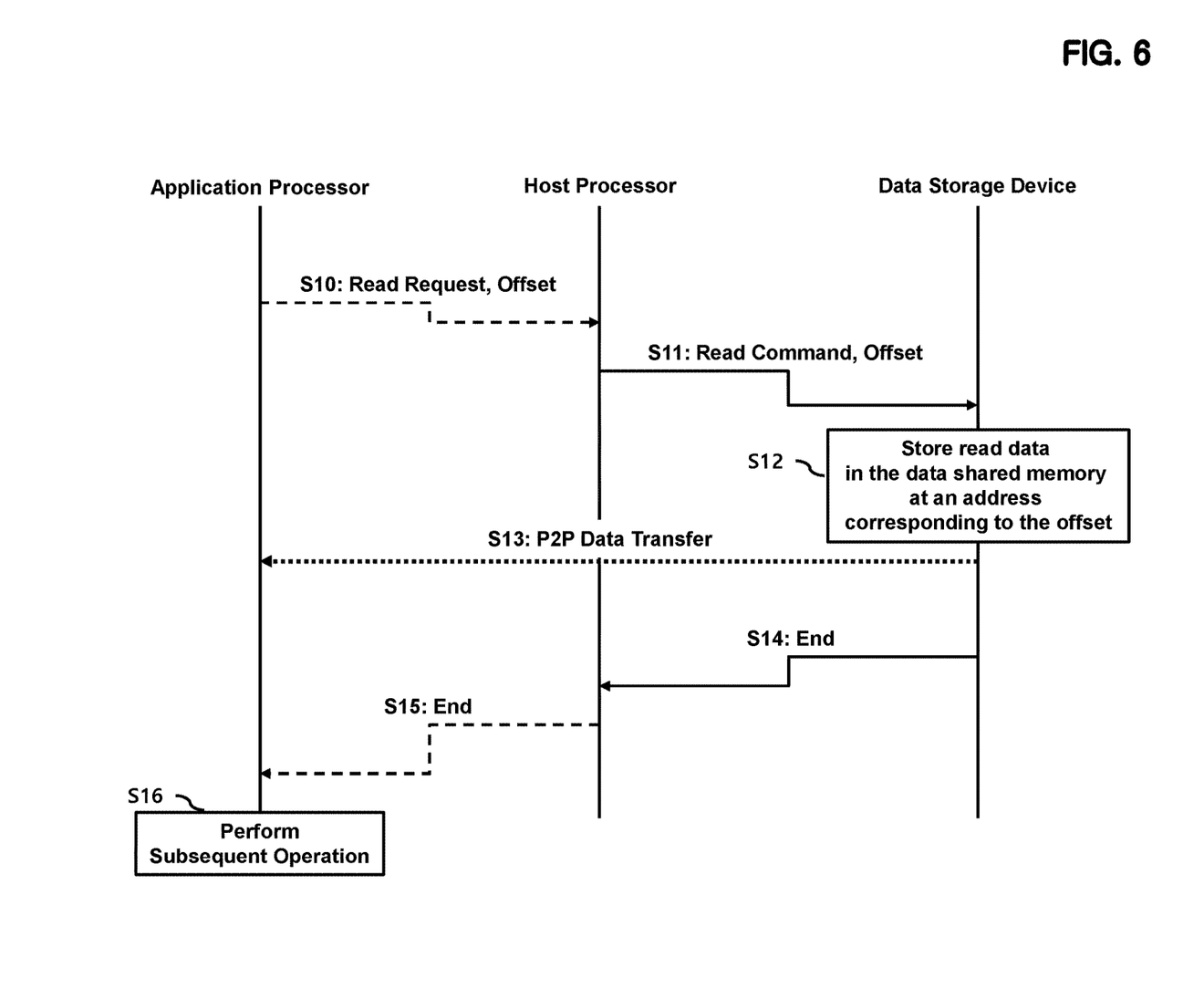
FIG. 6 illustrates a read operation according to an embodiment of the present disclosure.

FIG. 6 illustrates a read operation according to an embodiment of the present disclosure.

The shared memory control circuit 210 of the application processor 200 transfers a read request and offset information generated by the request generating circuit 230 to the application processor shared memory 120 of the host processor 100 at step S10.

The command control circuit 130 of the host processor 100 transmits a read command and offset corresponding to the read request to the data storage device 300 at step S11.

At this time, the read command may include an address or a key where read data is stored.

Thereafter, the command processing circuit 310 of the data storage device 300 controls the flash memory device 340 to output the read data, and stores the read data in the data shared memory 350 with reference to offset information at step S12.

Thereafter, the first data IO control circuit 240 of the application processor 200 and the second data IO circuit 360 of the data storage device 300 control an operation of transmitting data in a P2P manner and transmits the read data stored in the data shared memory 350 to the data memory 220 at step S13.

Thereafter, the command processing circuit 310 of the data storage device 300 transmits completion of the read operation to the host processor 100 at step S14.

Thereafter, the request management circuit 110 of the host processor 100 records a flag representing completion of the request in the application processor shared memory 120 at step S15.

The shared memory control circuit 210 of the application processor 200 monitors the application processor shared memory 120 to detect the completion of the request, and the request generating circuit 230 performs a subsequent operation such as a computation operation using the read data stored in the data memory 220 at step S16.

Figure 7:
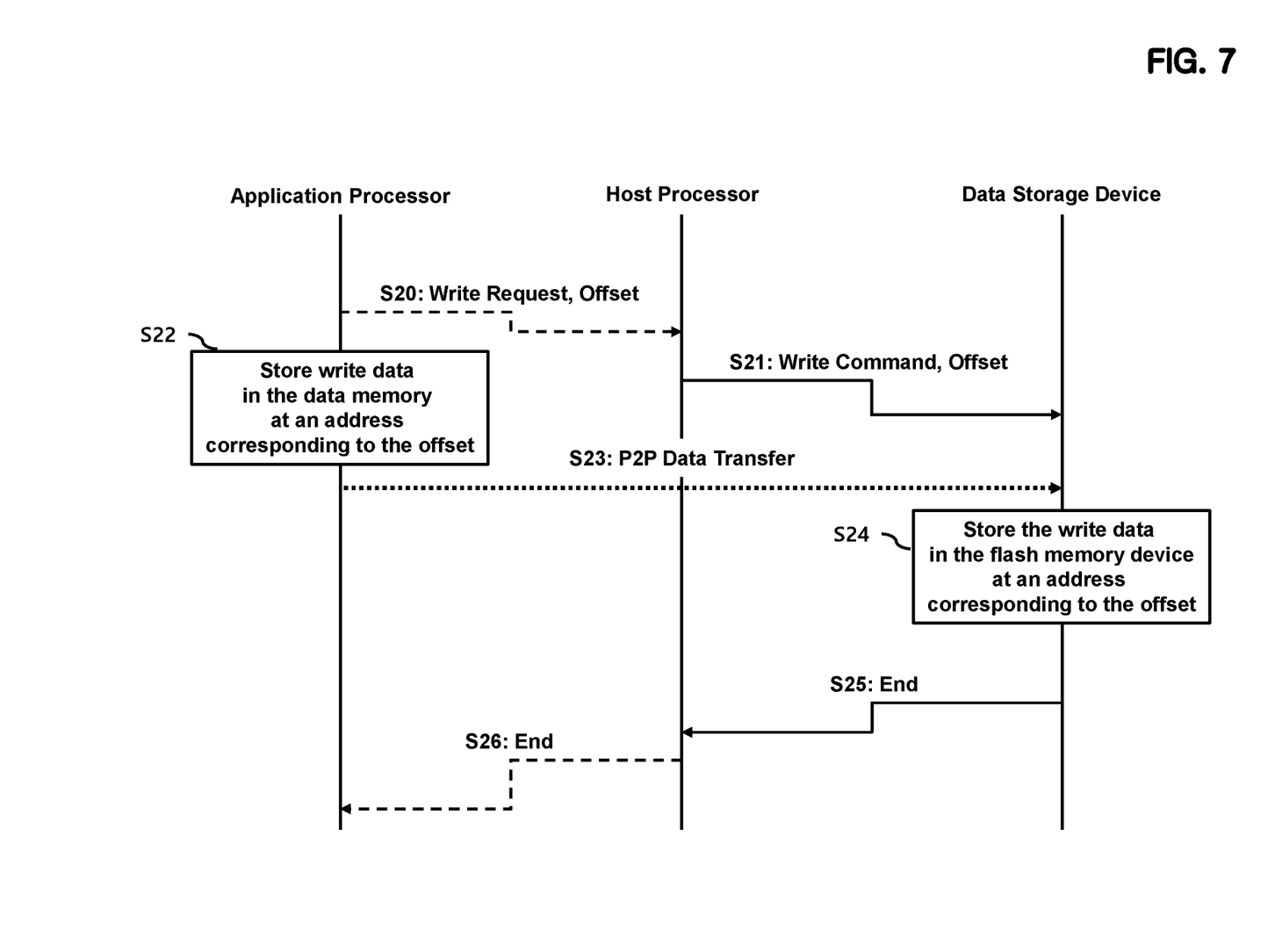
FIG. 7 illustrates a write operation according to an embodiment of the present disclosure.

FIG. 7 illustrates a write operation according to an embodiment of the present disclosure.

The shared memory control circuit 210 of the application processor 200 transfers a write request and offset information generated by the request generating circuit 230 to the application processor shared memory 120 of the host processor 100 at step S20.

The command control circuit 130 of the host processor 100 transmits a write command and offset information corresponding to the write request to the data storage device 300 at step S21.

At this time, the write command may include an address or a key where write data to be stored.

In the application processor 200, the request generating circuit 230 generates the write data and stores the write data in the address corresponding to the offset information in the data memory 220 at step S22.

It is sufficient if the step S22 is completed before the P2P data exchange is performed after the write request is generated.

Thereafter, the first data IO control circuit 240 of the application processor 200 and the second data IO circuit 360 of the data storage device 300 control the operation of transmitting data in a P2P manner to the data memory 220. The write data is transferred to the data shared memory 350 at step S23.

Thereafter, the command processing circuit 310 of the data storage device 300 performs a write operation by writing the write data stored in an address corresponding to the offset in the data shared memory 350 into a write address of the flash memory device 340 at step S24.

Thereafter, the command processing circuit 310 of the data storage device 300 transmits completion of the write operation to the host processor 200 at step S25.

Thereafter, the request management circuit 110 of the host processor 100 records a flag representing completion of the request in the application processor shared memory 120 at step S26.

The shared memory control circuit 210 of the application processor 200 monitors the application processor shared memory 120 to detect completion of the request, and accordingly, the request generating circuit 230 may perform a subsequent operation.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A system comprising:
a graphics processing unit (GPU) configured to generate a read request and including a data memory;
a central processing unit (CPU) configured to generate a read command corresponding to the read request; and
a data storage device including a data storage memory,
wherein the data storage device transmits entire read data output from the data storage device according to the read command to the data memory of the GPU without passing the CPU,
wherein the data storage device further comprises a data shared memory storing the read data,
wherein the data shared memory includes an address space shared with the data memory, and
wherein the GPU transfers offset information regarding an address of the data memory along with the read request to the CPU, the CPU transfers the read command with the offset information to the data storage device, and the data storage device stores the read data in the data shared memory at an address corresponding to the offset information.

2. The system of claim 1, wherein the GPU further comprises a first data input/output (IO) control circuit to transfer the read data received from the data storage device to the data memory.

3. The system of claim 2, wherein the data storage device further comprises a second data IO control circuit to transfer the read data stored in the data shared memory to the data memory.

4. The system of claim 1, wherein the CPU comprises:
a GPU shared memory configured to store the read request provided by the GPU;
a request management circuit configured to monitor the GPU shared memory; and
a command control circuit configured to generate the read command corresponding to the read request stored in the GPU shared memory.

5. The system of claim 4, wherein the request management circuit controls the command control circuit so that the read command corresponding to the read request is generated when the read request is stored in the GPU shared memory, and records a flag representing completion of processing of the read command in the GPU shared memory when processing of the read command is completed.

6. The system of claim 1, wherein the GPU comprises:
a request generating circuit configured to generate the read request; and
a shared memory control circuit configured to transfer the read request to the GPU and to monitor completion of processing of the read request.

7. The system of claim 6, wherein the shared memory control circuit records a flag representing completion of processing when processing of the request is completed and the request generating circuit performs a subsequent operation by receiving the read data from the data memory.

8. The system of claim 1, wherein the data storage device further comprises a command processing circuit to control the data storage device so that the read data is output according to the read command.

9. The system of claim 8, wherein the command processing circuit notifies completion of processing of the read command when the read data is transferred to the GPU.

10. The system of claim 1, further comprising a bus circuit coupling the GPU and the CPU, the CPU and the data storage device, or the data storage device and the GPU.

11. The system of claim 1, wherein the data storage device is a key-value based device,
wherein the read request has a format for reading a value corresponding to a key and the read data includes the value corresponding to the key.

12. A system comprising:
a graphics processing unit (GPU) configured to generate a read request and including a data memory;

a central processing unit (CPU) configured to generate a read command corresponding to the read request; and a data storage device including a data storage memory, wherein the data storage device transmits entire read data output from the data storage device according to the read command to the data memory of the GPU without passing the CPU, wherein the GPU further generates a write request and write data, the GPU stores the write data in the data memory, and the GPU transfers the write data to the data storage device without passing the CPU, wherein the data storage device further comprises a data shared memory to store the write data, and the data shared memory includes an address space shared with the data memory, and wherein the GPU transfers offset information regarding an address of the data memory where the write data is stored along with the write request to the CPU, the CPU transfers the write request with the offset information to the data storage device, and the data storage device stores the write data in the data shared memory at an address corresponding to the offset information.

13. The system of claim 12, wherein the GPU further comprises a first data IO control circuit to transfer the write data stored in the data memory to the data storage device.

14. The system of claim 13, wherein the data storage device further comprises a second data IO control circuit to transfer the write data to the data shared memory referring to the offset information.

* * * * *